Feb. 2, 1937.　　　P. F. SPERRY　　　2,069,728
HEAT EXCHANGE DEVICE
Filed June 1, 1936　　　3 Sheets-Sheet 1
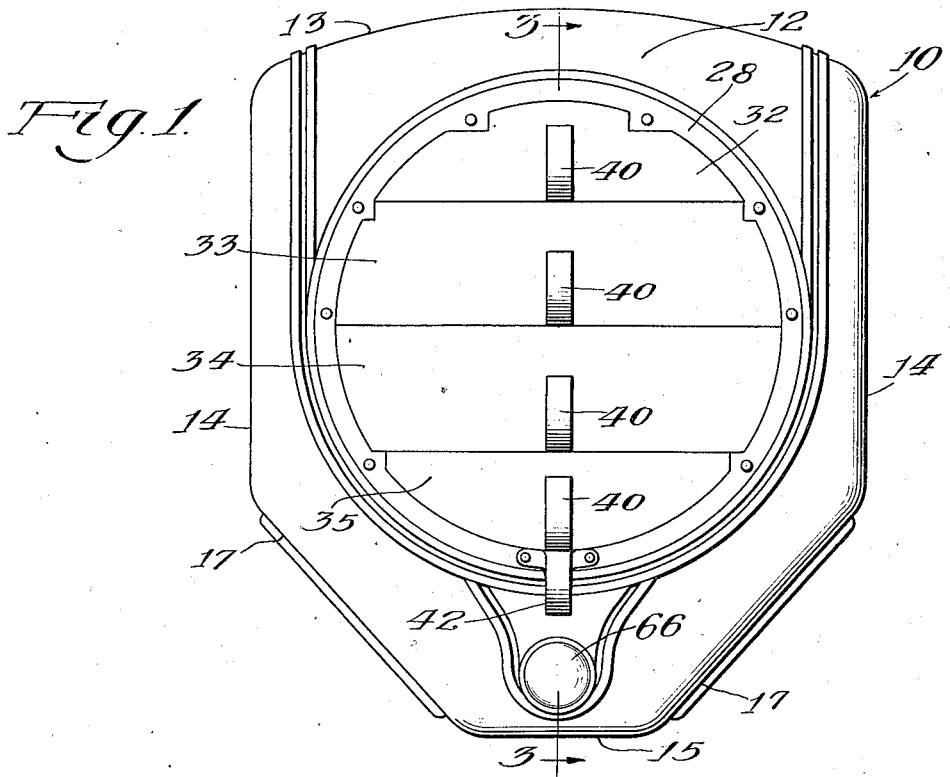
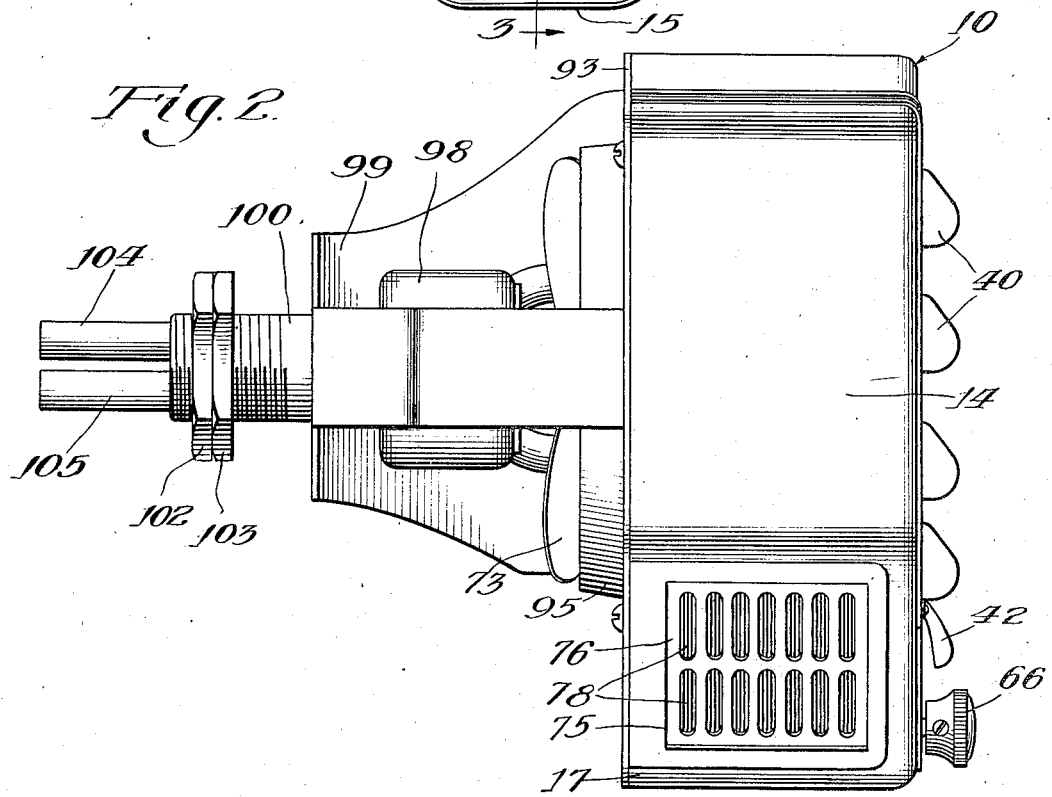
Inventor:
Philmore F. Sperry,
By Zabel, Carlson & Wells
Attorneys Feb. 2, 1937.  P. F. SPERRY  2,069,728
HEAT EXCHANGE DEVICE
Filed June 1, 1936  3 Sheets-Sheet 2
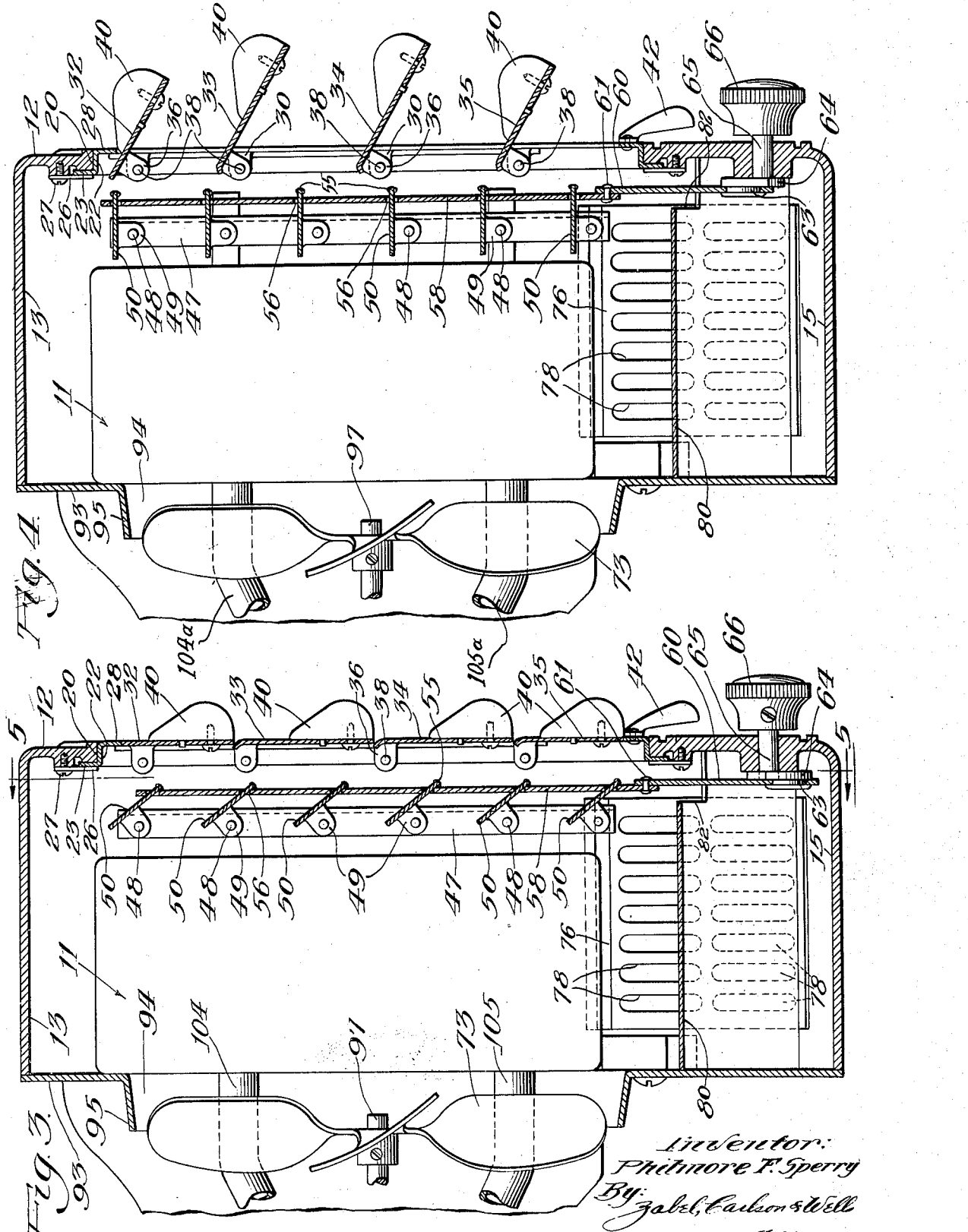
Inventor:
Philmore F. Sperry
By Zabel, Carlson & Well
Attorneys Feb. 2, 1937. P. F. SPERRY 2,069,728
HEAT EXCHANGE DEVICE
Filed June 1, 1936 3 Sheets-Sheet 3

Inventor:
Philmore F. Sperry,
By Zabel, Carlson & Wells
Attorneys

Patented Feb. 2, 1937

2,069,728

UNITED STATES PATENT OFFICE 2,069,728

HEAT EXCHANGE DEVICE

Philmore F. Sperry, Chicago, Ill., assignor to Excel Auto Radiator Company, Chicago, Ill., a corporation of Delaware Application June 1, 1936, Serial No. 82,886

5 Claims. (Cl. 257—137)

The invention relates to heat exchange devices and is particularly adapted to be embodied in automobile heaters.

One form of the invention is embodied in an automobile heater adapted to be mounted on a dash board of an automobile and comprising a radiator core which is connected to the cooling system of the automobile and is enclosed within a housing having means mounted thereon for controlling the direction in which heated air is advanced from the core by a fan which is operatively connected to the electrical system of the automobile. The means for controlling the direction in which air is advanced from the core comprises a plurality of manually adjustable baffles or shutters mounted in the front wall of the housing, a plurality of manually adjustable baffles mounted within the housing directly in back of the first-mentioned adjustable shutters or baffles and a fixed baffle mounted in the lower part of the housing for directing the heated air through a plurality of slots or apertures provided in the bottom wall of the housing, the construction being such that the baffles mounted within the housing in back of the baffles mounted on the front wall may be adjusted to direct the air advanced by the fan to the fixed baffle so that the heated air will be discharged from the housing through the slots or apertures in the lower wall of the housing instead of through the front wall of the housing. The movable or adjustable baffles may be adjusted at will by the operator to control the direction in which the heated air flows into the interior of the automobile.

Other objects and advantages will become apparent as the following detailed description progresses, reference being had to the accompanying drawings, wherein—

Fig. 1 is a front view of an automobile heater which embodies the invention.

Fig. 2 is a side elevation of the improved heater.

Fig. 3 is an enlarged section taken on line 3—3 of Fig. 1.

Fig. 4 is an enlarged section taken on the same line as Fig. 3 but showing the adjustable baffles in changed positions.

Figure 6:
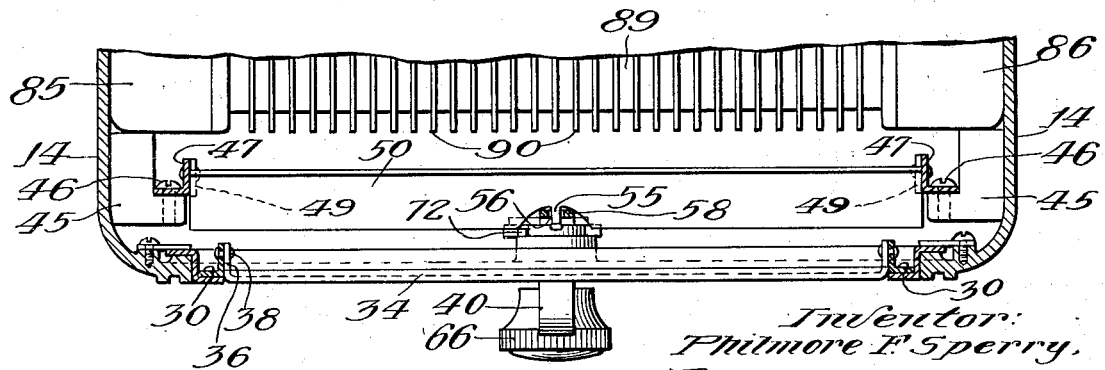
Fig. 6 is a fragmentary section taken on line 6—6 of Fig. 5.

Referring to the drawings wherein a preferred embodiment of the invention is illustrated, the reference character 10 designates generally a housing in which a core 11 is mounted. The housing 10 preferably comprises a front wall 12, a top wall 13, side walls 14 and a bottom wall 15, the bottom wall 15 preferably comprising a central portion 16 which is connected by inclined portions 17 to the side walls 14. The front wall 12 is provided with a relatively large aperture 20 in which a ring or annulus 22 is rotatably mounted, the ring or annulus 22 being provided with an outwardly directed flange 23 at its periphery, which flange is rotatably journalled between the front wall 12 and a plurality of bars or clips 26 secured to the front wall 12 by screws 27. The flange 23 co-operates with the front wall 12 and the bars or clips 26 to prevent forward or rearward displacement of the ring or annulus 22 with respect to the front wall 12. The ring or annulus 22 comprises an inwardly directed annular flange 28 to the inner surface of which are secured a plurality of brackets 30 for pivotally mounting a plurality of adjustable shutters or baffles 32, 33, 34 and 35, the baffles or shutters 32, 33, 34 and 35 being provided with ears 36 which are pivoted to the brackets 30 by pins 38 (Figs. 3, 4 and 6). As best shown in Figs. 1, 3, 4 and 6, the shutters are shaped so that they may be adjusted to close the aperture in the annulus or ring 22. Each of the adjustable shutters 32, 33, 34 and 35 is provided with a handle member 40 which may be grasped by the operator when the shutters or baffles 32, 33, 34 and 35 are adjusted into positions desired by the driver. The pivotal connections of the ears 36 to the brackets 30 preferably provide sufficient friction so that the shutters or baffles 32 to 35, inclusive, will remain in their adjusted positions. A handle member 42 fixed to the flange 28 of the ring or annulus 22 may be employed by the driver to displace the ring or annulus 22 with its shutters 32 to 35, inclusive, angularly to direct the heated air as desired by the driver. In Fig. 4, the shutters or baffles 32 to 35, inclusive, direct the heated air downwardly toward the feet of the driver. In Fig. 3 the shutters or baffles 32 to 35, inclusive, are in their closed positions so that the heated air can not be advanced through the aperture 20 in the front wall 12 of the heater.

Figure 5:
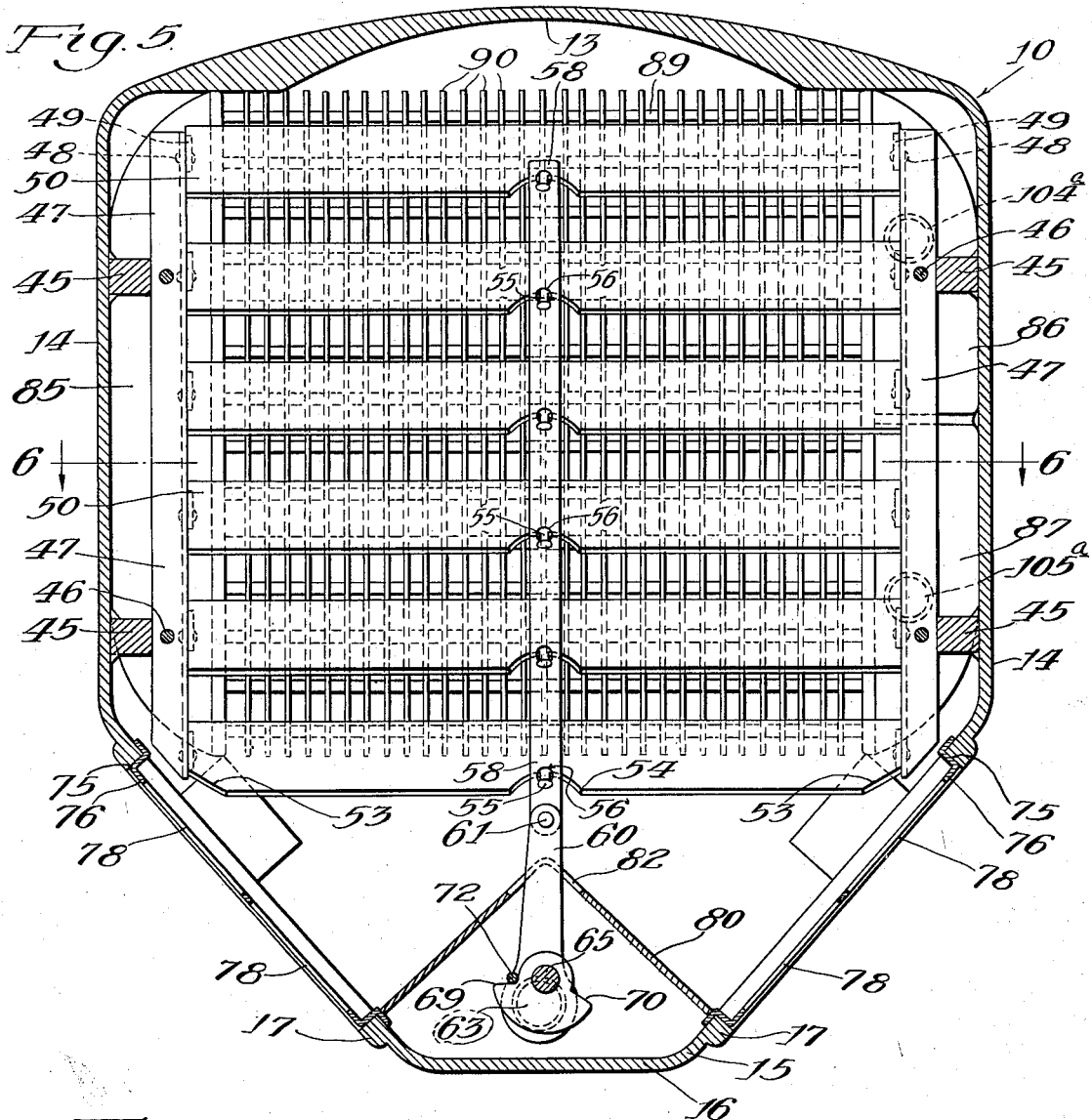
Fig. 5 is a section taken on line 5—5 of Fig. 3.

As best shown in Figs. 5 and 6, a plurality of brackets 45 are welded or otherwise secured to the inner surfaces of the side walls 14. Secured to the brackets 45 by screws 46 are vertically disposed angle irons 47 to which are pivoted by pins 48, ears 49 projecting from adjustable baffles 50. The adjustable baffles 50 are substantially identical in size and shape with the exception of the lower-most baffle 50 which has two of its lower corners cut away as indicated at 53 (Fig. 5). Each of the baffles 50 is provided with a central recess 54 in its lower or forward edge. At the center of the recess 54, the baffles are provided with forwardly projecting integral lugs 55 which project into slots 56 formed in a vertically disposed bar 58 which has its lower end pivoted to a lever 60 by a pin 61. The lever 60 is pivoted upon a short pin 63 formed integral with a plate 64 which, in turn, is formed integral with a pin 65 journalled in the front wall 12, the pin 65 being provided with a knob 66 whereby the pin 65 together with the plate 64 and the pin 63 may be displaced angularly around the longitudinal axis of the pin 65. It will be noted that the pin 63 is disposed eccentrically with respect to the pin 65 so that if the knob 66 is rotated, the lever 60 will be raised or lowered dependent upon the direction in which the knob 66 is rotated.

As best shown in Fig. 5, the plate 64 is provided with shoulders 69 and 70 extending radially with respect to the longitudinal axis of the pin 65. When the lever 60 is in the position wherein it is shown in Fig. 5, the shoulder 69 abuts against the pin 72 projecting inwardly from the front wall 12. When the shoulder 69 abuts against the pin 72, the baffles 50 are in the positions wherein they are shown in Fig. 3. However, if the knob 66 is displaced angularly in a counter-clockwise direction (Fig. 5) to bring the shoulder 70 into contact with the pin 72 the lever 60 will move upwardly to displace the bar 58 upwardly and the bar 58 will bring the baffles 50 into the position wherein they are shown in Fig. 4 so that they offer substantially no resistance to air being advanced through the core 11 by a fan 73 disposed directly behind the core. It is readily understood that the baffles 50 may be disposed in positions intermediate the positions wherein they are shown in Figs. 3 and 4 and it is readily understood that the shutters or baffles 32 to 35, inclusive, may be adjusted into positions wherein they are shown in Figs. 3 and 4. It is also readily understood that the shutters or baffles 32 to 35, inclusive, may be adjusted independently with each other with respect to the annulus or ring 22.

The inclined portions 17 of the bottom wall 15 are provided with large apertures 75 in which sheet metal plates 76 are fixed, the plates 76 being provided with apertures 78 of any suitable shape. An angle-shaped sheet metal baffle 80 is disposed within the housing 10 in the lower portion thereof. One leg of the baffle 80 abuts against the lower end of the plate 76 associated with one of the walls 17 and the other leg of the baffle 80 abuts against the lower end of the plate 76 associated with the other wall 17. The baffle 80 is apertured as at 82 so that the lever 60 may project therethrough. It will be readily understood that when heated air is advanced through the core 11 against the baffles 50 when they are in the positions illustrated in Fig. 3, the heated air will be deflected downwardly toward the baffle 80 and will be divided by the baffle 80 into two streams which will flow through the apertures 78 of the plates 76.

The core 11 comprises a tank 85 as shown at the left hand side of Fig. 5. At the right hand side of Fig. 5 it will be noted that the core 11 is provided with an upper tank 86 and a lower tank 87. The tanks 86 and 87 communicate with the tank 85 through a plurality of tubes 89 which are provided with sheet metal fins 90.

The housing 13 is provided with a rear wall 93 having a central aperture 94 and a rearwardly extending annular flange 95 extending around the fan 73 (Figs. 3 and 4). The fan 73 is mounted on the shaft 97 of an electric motor 98 (Fig. 2) which is connected operatively to the electrical system of the automobile in which the heater is mounted. The motor 98 is secured to a bracket 99 which carries the housing 10. Projecting through the bracket 99 and secured thereto is a cylindrical member 100 which is screw-threaded to receive nuts 102 and 103. The construction is such that the cylindrical member 100 may be disposed in an aperture in the dashboard of the automobile in which the heater is mounted and the dashboard (not shown) may be clamped between the bracket 99 and the nuts 102 and 103. Obviously, the heater will then be secured rigidly to the dashboard. A pair of tubes 104 and 105 projecting from the rear end of the cylindrical member 100 are connected to the cooling system of the automobile by suitable means (not shown). The tubes 104 and 105 communicate with passages in the cylindrical member 100 and these passages communicate with the tanks 86 and 87 through tubes 104a and 105a (Fig. 4). When the heater is in operation, the liquid from the cooling system flows through the tubes 104 and 104a into the tank 86, then through the upper tubes 89 to the tank 85, then through the lower tubes 89 to the tank 87 and then returns to the cooling system through the tubes 105a and 105.

It will be readily understood that when the shutters 32 to 35, inclusive, and the baffles 50 are adjusted in the positions wherein they are shown in Fig. 4, the heated air will be advanced mainly through the aperture in the ring or annulus 22 to impinge upon the baffles 32 to 35, inclusive, and will then be directed downwardly and forwardly toward the driver's feet. Shutters 32 to 35, inclusive, are then adjusted into substantially horizontal positions, the heated air will not be deflected downwardly to any appreciable extent. If the shutters 32 to 35, inclusive, are in the positions wherein they are shown in Fig. 4 and the ring or annulus 22 is displaced angularly, the direction in which the heated air is advanced by the shutters 32 to 35, inclusive, can be controlled as desired by the driver.

If the baffles 50 are in the positions wherein they are shown in Fig. 3 and the shutters 32 to 35, inclusive, are in the positions wherein they are shown in Fig. 4, a large proportion of the heated air advanced through the core 11 will be deflected downwardly to be discharged from the housing 10 through the apertures 78 to the bottom of the compartment in which the driver sits. If the shutters 32 to 35, inclusive, are then closed, substantially all of the heated air will be discharged through the apertures 78.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as permissible, in view of the prior art.

I claim:

1. A heat exchange device comprising a housing having top, bottom, side and front walls, said front wall having a large aperture therein and said bottom wall having inclined apertured portions through which air may pass downwardly and laterally with respect to said heat exchange device, a radiator core disposed in said housing, means for advancing air through said radiator core into said housing, a plurality of adjustable shutters for closing the aperture in said front wall, a plurality of adjustable baffles mounted in said housing for directing said air downwardly through the apertures in the inclined portions of the bottom wall, and means for adjusting said adjustable baffles simultaneously.

2. A heat exchange device comprising a housing having top, bottom, side and front walls, said front wall having a large aperture therein and said bottom wall having apertures therein through which air may pass downwardly with respect to said heat exchange device, a ring rotatably journalled in the aperture in said front wall, a plurality of shutters adjustably mounted on said ring for closing the aperture therethrough, a radiator core disposed in said housing, means for advancing air through said radiator core into said housing, a plurality of adjustable baffles mounted in said housing for directing said air downwardly through the apertures in the bottom wall, and means for adjusting said baffles simultaneously.

3. A heat exchange device comprising a housing having top, bottom, side and front walls, said front wall having a large aperture therein and said bottom wall having inclined apertured portions through which air may pass downwardly and laterally with respect to said heat exchange device, a radiator core disposed in said housing, means for advancing air through said radiator core into said housing, a plurality of adjustable shutters for either closing the aperture for said front wall or for varying the direction of discharge of air passing therethrough, means for adjusting said shutters as a unit, means for adjusting said shutters independently, a plurality of adjustable baffles mounted in said housing for varying the flow of air through the front wall aperture or downwardly through the inclined apertures in the bottom wall, and means adjusting said baffles simultaneously.

4. A heat exchange device comprising a housing having top, bottom, side and front walls, said front wall having a large aperture therein and said bottom wall having inclined apertured portions through which air may pass downwardly and laterally with respect to said heat exchange device, a radiator core disposed in said housing, means for advancing air through said radiator core into said housing, control means for the large front aperture, a fixed baffle for dividing the downwardly directed air between the inclined apertures in the bottom wall, and a plurality of adjustable baffles mounted in the housing inwardly of said front aperture for effecting directional control over all of the air leaving the core to direct the same either through the apertures in the bottom wall or through the front wall aperture.

5. A heat exchange device comprising a housing having top, bottom, side and front walls, said front and bottom walls having apertures therein through which air may pass horizontally or downwardly with respect to said heat exchange device, a radiator core disposed in said housing, means for advancing air through said radiator core into said housing, means in the front wall aperture operable to prevent the passage of air therethrough or to direct all of, or any part of, the air leaving the core either horizontally or at an angle to the horizontal, and means in the housing constructed and arranged to effect directional control over all of the air leaving the core to proportion its delivery between the apertures in the front and bottom walls.

PHILMORE F. SPERRY.